United States Patent
Parmegiani et al.

(10) Patent No.: US 11,672,248 B2
(45) Date of Patent: Jun. 13, 2023

(54) DEVICE FOR FREEZING ADIPOSE TISSUE

(71) Applicant: NTERILIZER S.R.L., Bologna (IT)

(72) Inventors: Lodovico Parmegiani, Bologna (IT); Silvio Laureti, Bologna (IT)

(73) Assignee: NTERILIZER S.R.L., Bologna (IT)

( * ) Notice: Subject to any disclaimer, the term of this patent is extended or adjusted under 35 U.S.C. 154(b) by 0 days.

(21) Appl. No.: 16/966,996

(22) PCT Filed: Feb. 1, 2019

(86) PCT No.: PCT/IB2019/050823
§ 371 (c)(1),
(2) Date: Aug. 3, 2020

(87) PCT Pub. No.: WO2019/150318
PCT Pub. Date: Aug. 8, 2019

(65) Prior Publication Data
US 2020/0390090 A1     Dec. 17, 2020

(30) Foreign Application Priority Data

Feb. 5, 2018   (IT) .................... 102018000002414

(51) Int. Cl.
*A01N 1/02*   (2006.01)
(52) U.S. Cl.
CPC ......... *A01N 1/0268* (2013.01); *A01N 1/0289* (2013.01)
(58) Field of Classification Search
CPC ...... A01N 1/0268; A01N 1/0289; A01N 1/02; A01N 1/0263; A01N 1/0257; A61B 10/0096; C12M 45/22
(Continued)

(56) References Cited

U.S. PATENT DOCUMENTS

| | | | | |
|---|---|---|---|---|
| 6,383,453 B1 * | 5/2002 | Banauch | ............... | B01L 3/5085 220/326 |
| 2004/0214316 A1 * | 10/2004 | O'Connell | ............. | C12M 45/22 435/309.1 |

(Continued)

FOREIGN PATENT DOCUMENTS

| | | | | |
|---|---|---|---|---|
| DE | 8118819 | | 7/1982 | |
| JP | 4882494 | | 2/2012 | |
| JP | 4882494 B2 * | | 2/2012 | ........... A01N 1/0268 |

OTHER PUBLICATIONS

JP4882494B2 Machine English Translation (Year: 2012).*

*Primary Examiner* — Michael L Hobbs
*Assistant Examiner* — Lenora A Abel
(74) *Attorney, Agent, or Firm* — Duane Morris LLP; Gregory M. Lefkowitz; Randall C. Pyles

(57) ABSTRACT

A device for freezing adipose tissue comprises a first member and a second member which are mutually coupleable so as to obtain at least one closed configuration; the first member comprising at least one manual grip portion and at least one support portion to which the adipose tissue adheres; the second member comprising at least one housing wherein at least the support portion of the first member is insertable. The second member comprises at least one safety valve that comprises at least one separable portion adapted to detach, partially or completely, from the body of said second member in the case the pressure difference between the inside and the outside exceeds a predetermined value. The second member comprises retention means of the separable portion once it has detached. The detachment of the separable portion creates an opening in the second member, and a gap is defined for the discharge of the gases contained within the housing.

15 Claims, 7 Drawing Sheets

(58) Field of Classification Search
USPC .................................................... 435/284.1
See application file for complete search history.

(56) References Cited

U.S. PATENT DOCUMENTS

| | | | |
|---|---|---|---|
| 2011/0143452 A1* | 6/2011 | Che | B01L 3/0275 436/180 |
| 2014/0157798 A1* | 6/2014 | Jimenez-Rios | A01N 1/0268 62/62 |
| 2015/0044765 A1 | 2/2015 | Inoue | |
| 2015/0048085 A1* | 2/2015 | Brown | B65D 83/0022 220/23.83 |
| 2016/0174545 A1* | 6/2016 | Parra | A01N 1/0268 435/284.1 |

* cited by examiner

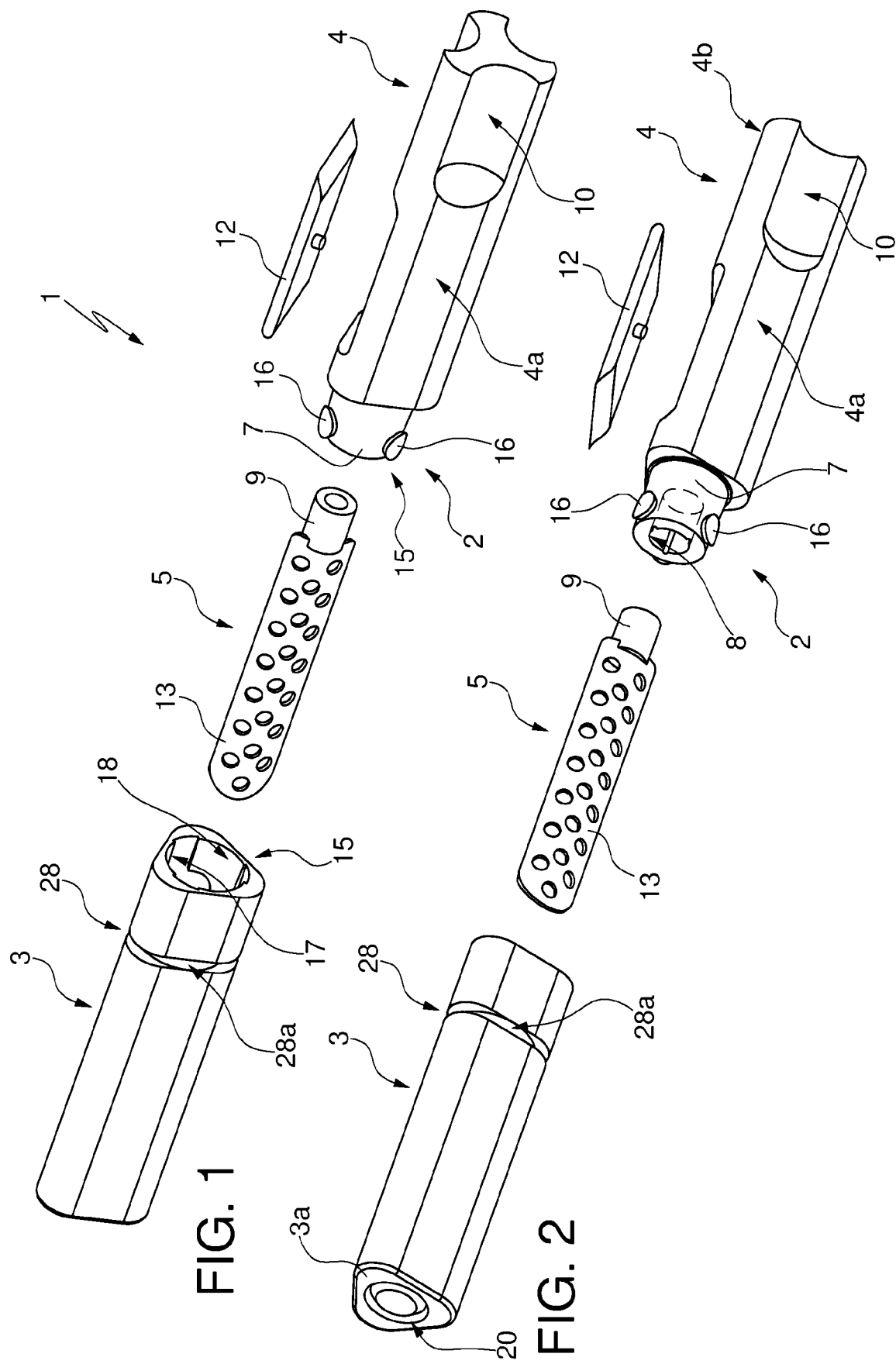

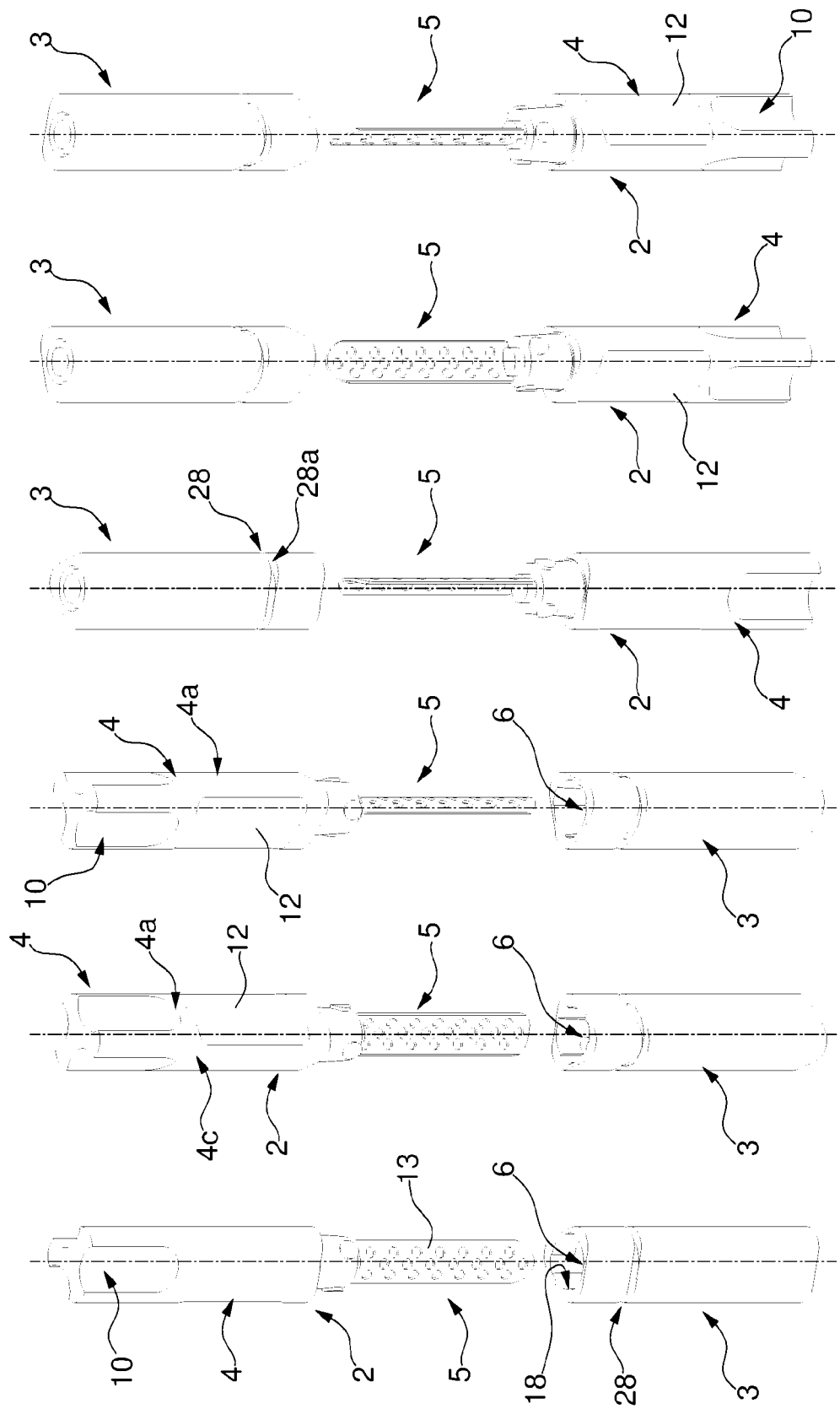

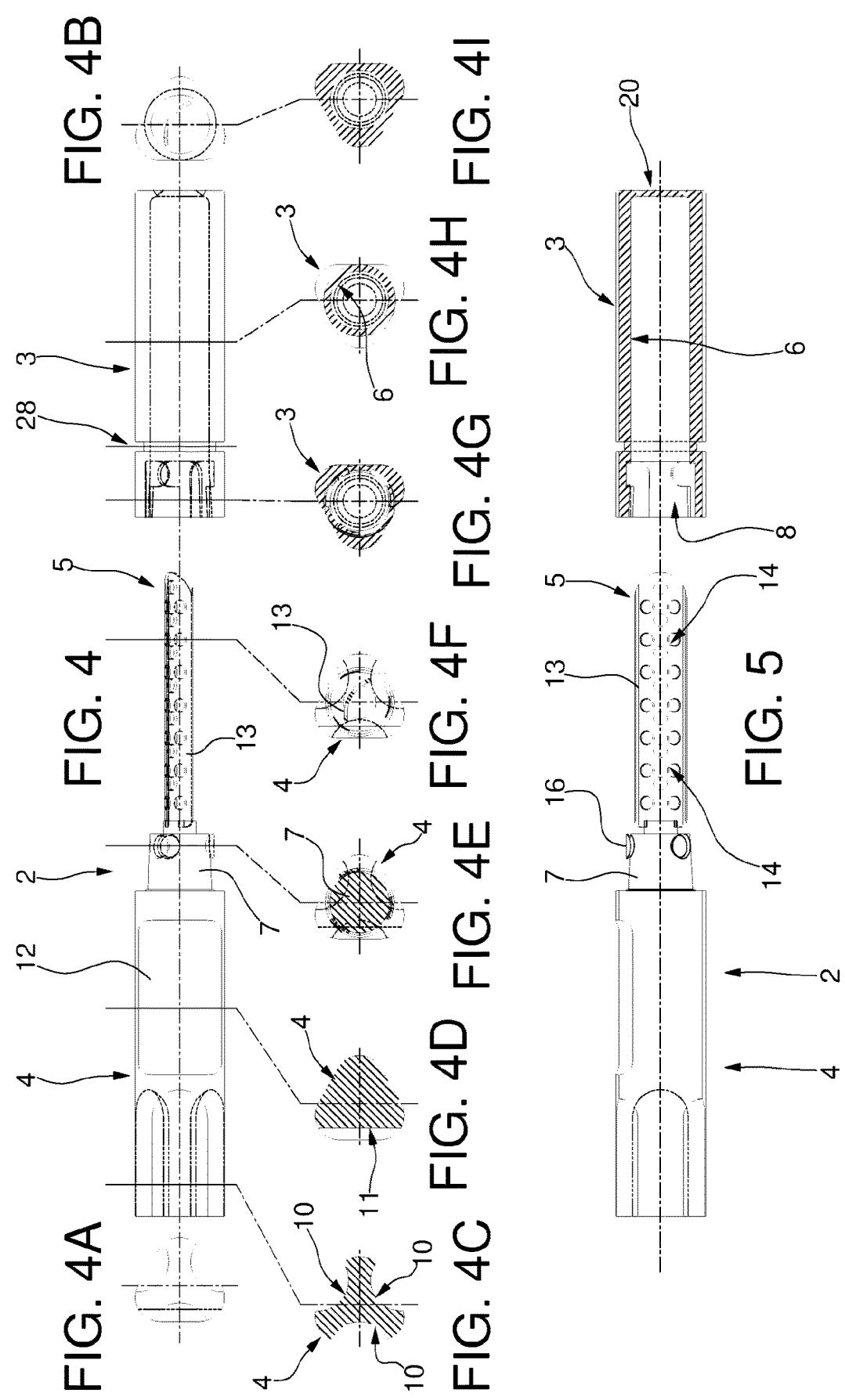

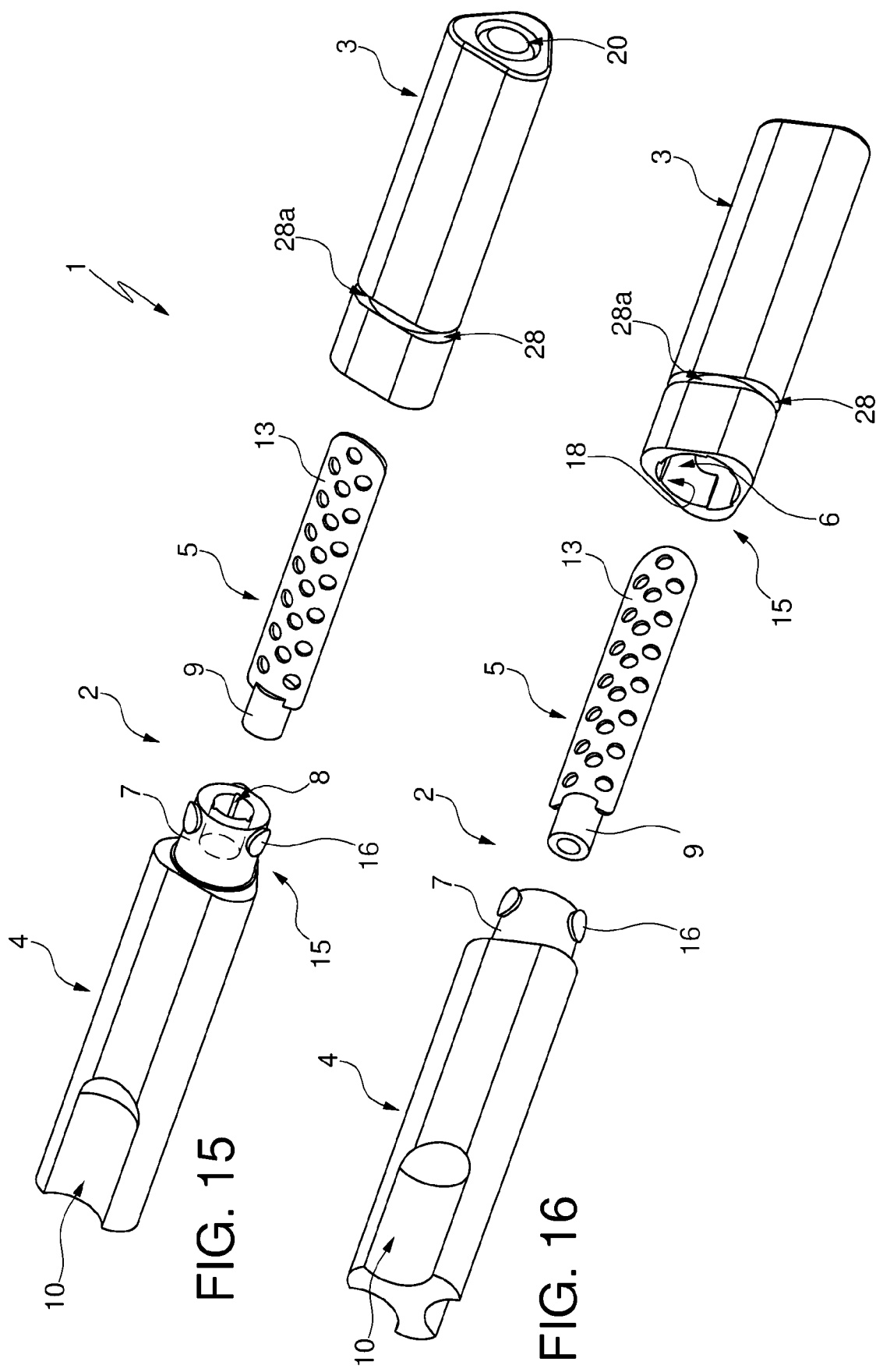

DEVICE FOR FREEZING ADIPOSE TISSUE

CROSS-REFERENCE TO RELATED APPLICATIONS

This application is a § 371 national stage entry of International Application No. PCT/IB2019/050823, filed Feb. 1, 2019, which claims priority of Italian National Applications No. 102018000002414, filed Feb. 5, 2018, the entire contents of which are incorporated herein by reference.

TECHNICAL FIELD OF THE INVENTION

The present invention relates to a device for freezing adipose tissue.

More particularly, the present invention relates to a device for freezing adipose tissue adapted to be immersed in liquid nitrogen.

DESCRIPTION OF THE PRIOR ART

Human adipose tissue is a source of stem cells, which is ideal for autologous cell therapies.

The preferred condition for tissue engineering and regenerative medicine applications is the availability of "fresh" cells and cell products, immediately usable from a clinical point of view.

Adipose tissue can be recovered from areas where it accumulates in the body, and immediately re-transplanted in the area to be treated in the same patient.

Autologous adipose tissue is removed through liposuction. To avoid repeating multiple liposuction interventions, the adipose tissue can be cryopreserved in an aseptic manner, in order to be subsequently re-transplanted.

The re-transplant of frozen/thawed adipose tissue is not yet a widespread clinical practice, but certain freezing techniques make it possible to obtain thawed adipose tissue having the same functionality as fresh tissue.

Cell and tissue freezing protocols aim at preventing the formation of intracytoplasmic to water crystals, which damage the cell cytoskeleton.

This is possible via vitrification, which is the conversion of a highly viscous liquid in its glassy state, when it is cooled below its glass transition temperature.

Any material can vitrify, which depends directly on its viscosity and on the cooling rate, and inversely on the volume of the sample.

In the case of cell vitrification, the viscosity is increased through dehydration, and the high cooling rate is guaranteed by direct immersion in liquid nitrogen; specific devices for the vitrification of single cells have been developed for this purpose.

Vitrification techniques have been widely used in areas where cryo-survival must be maximized, and in particular in human embryology for oocytes and embryos.

In particular, human reproductive cells and tissues are frozen by means of vitrification induced through direct immersion in liquid nitrogen; to this end, protocols and devices are used to reduce the risk of contamination of biological samples, and also made in such a way as to reduce the risk of freeze damage to which the reproductive cells and tissues are particularly exposed because they are rich in intracellular water.

An example of a device for the vitrification of reproductive cells or tissues by immersion in liquid nitrogen is described in the document EP 2 765 183 B1.

This device typically comprises a container of elongated shape, also called a stopper, open on one side, and a support for cells or tissues, insertable into the opening of such a container.

The support for cells or tissues comprises, in turn, an elongated portion—normally made of a material with good thermal conduction (such as a metal)—to which the cells or tissues themselves adhere, and a grip portion (associated with said elongated portion) that remains on the outside of the container when the two components are joined.

The protocols for freezing adipose tissue investigated thus far are those which envisage mechanical refrigeration, rapid freezing or slow controlled freezing in liquid nitrogen.

Since the direct immersion technique in liquid nitrogen—as mentioned, currently used for reproductive cells or tissues—provides satisfactory results and guarantees significant advantages from countless perspectives (for example, from the perspectives of equipment cost, practicality of use, operating times, and still others), operators in the sector feel the need to be able to invoke the same in different types of applications as well, and primarily—but not exclusively—in the cryopreservation of adipose tissues, to exploit the properties and abilities of the mesenchymal cells that are located among the adipose cells.

OBJECTS OF THE INVENTION

The technical scope of this invention is therefore to improve the state of the art in the field of freezing and cryopreservation of adipose tissue.

Within this technical scope, an object of the present invention is to develop a device which makes it possible to also use the direct immersion in liquid nitrogen technique for the cryopreservation of adipose tissue.

Another object of the present invention is to provide a device for freezing adipose tissue which is reliable and safe to use particularly, but not exclusively, from the point of view of eliminating contamination risks or loss of the removed tissue, and from the point of view of operator safety.

Still another object of the present invention is to provide a device which is improved and specifically developed for the optimal freezing of adipose tissue.

A further object of the present invention is to provide a device for freezing adipose tissue which is particularly practical and comfortable to use.

Another object of the present invention is to provide a device for freezing adipose tissue which is constructively simple and inexpensive.

This scope and these objects are all achieved by a device for freezing adipose tissue according to the attached claim 1.

The device comprises a first member and a second member which are mutually coupleable so as to obtain at least one closed configuration of cryopreservation of adipose tissue.

The first member comprises at least one manual grip portion and at least one support portion to which the adipose tissue adheres.

The second member comprises at least one housing wherein at least the support portion of the first member is insertable.

The second member comprises at least one safety valve, adapted to activate if the difference between the pressure outside and the pressure inside the housing of the second member exceeds a predetermined value; such safety valve comprises at least one separable portion of the second member, adapted to detach, partially or completely, from the body of the second member if the difference in pressure between the inside and the outside exceeds a predetermined value; the separable portion is delimited by a breakable zone.

According to one aspect of the invention, the second member comprises retention means of the separable portion, once the latter has detached; the detachment of this separable portion determines the creation of an opening in the second member, so that between the opening and the separable portion, retained by the retention means, a gap is defined for discharging the gases contained inside the housing.

In this way, if the pressure inside the housing were to increase for certain reasons (for example if any drops of liquid nitrogen which have accidentally penetrated inside the housing itself were to expand in an uncontrolled manner) the presence of the safety valve allows, on the one hand, the discharge to the outside of the gases contained in the housing through the aforesaid gap, thus protecting the operators; on the other hand, the same safety valve still retains the adipose tissue inside the housing, preventing it from being dispersed. Dependent claims refer to preferred and advantageous embodiments of the invention.

BRIEF DESCRIPTION OF DRAWINGS

These and additional advantages will be better understood by any technician skilled in the art from the following description and accompanying drawings, provided by way of non-limiting example, in which:

FIG. 1 is an exploded axonometric view of the device according to the invention;

FIG. 2 is an exploded axonometric view of the device from a different angle;

FIGS. 3A-3F are further axonometric views of the device, from respective different angles;

FIG. 4 is a side view of the device;

FIG. 4A is a front view of the device;

FIG. 4B is a rear view of the device;

FIGS. 4A-4I are cross-sections of the device respectively according to the planes C-C, D-D, E-E, F-F, G-G, H-H, I-I of FIG. 4;

FIG. 5 is a side and partly sectioned view of the device;

FIG. 15 is an exploded axonometric view of the device, according to another embodiment of the invention;

FIG. 16 is an exploded axonometric view of the device of FIG. 15 from a different angle.

EMBODIMENTS OF THE INVENTION

With particular reference to FIG. 1, the reference number 1 generally indicates a device for freezing adipose tissue according to the invention.

The device 1 comprises a first member 2.

The device 1 further comprises a second member 3.

The first member 2 and the second member 3 are mutually coupleable, in the manner described in greater detail hereinafter, so as to obtain at least one closed configuration of adipose tissue cryopreservation.

Figure 7:
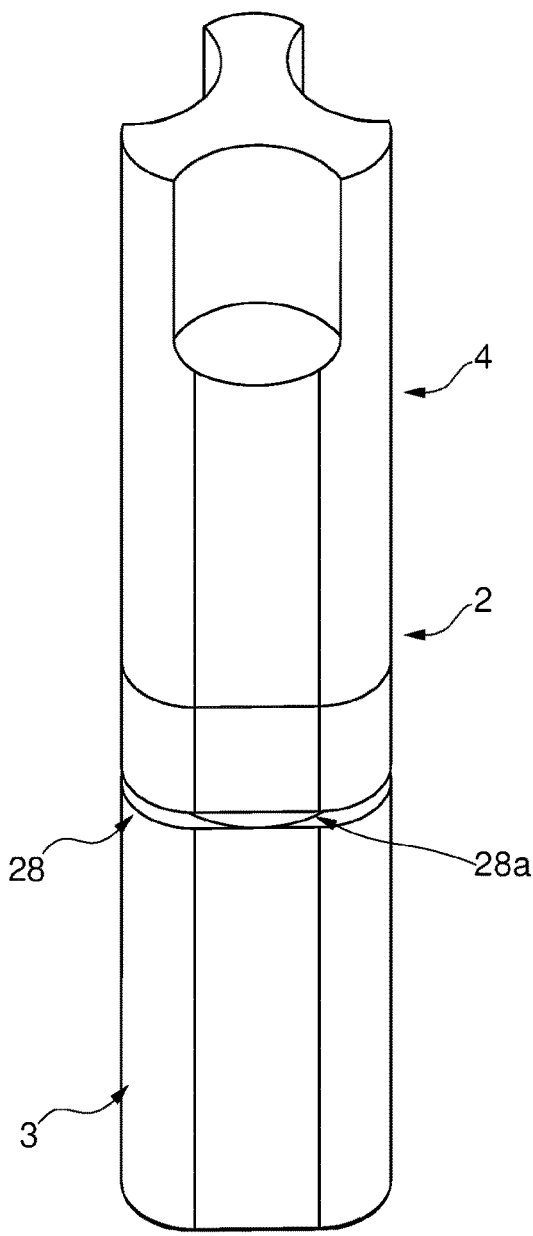
FIG. 7 is an axonometric view of the device with the first member and the second member coupled.
Figure 12:
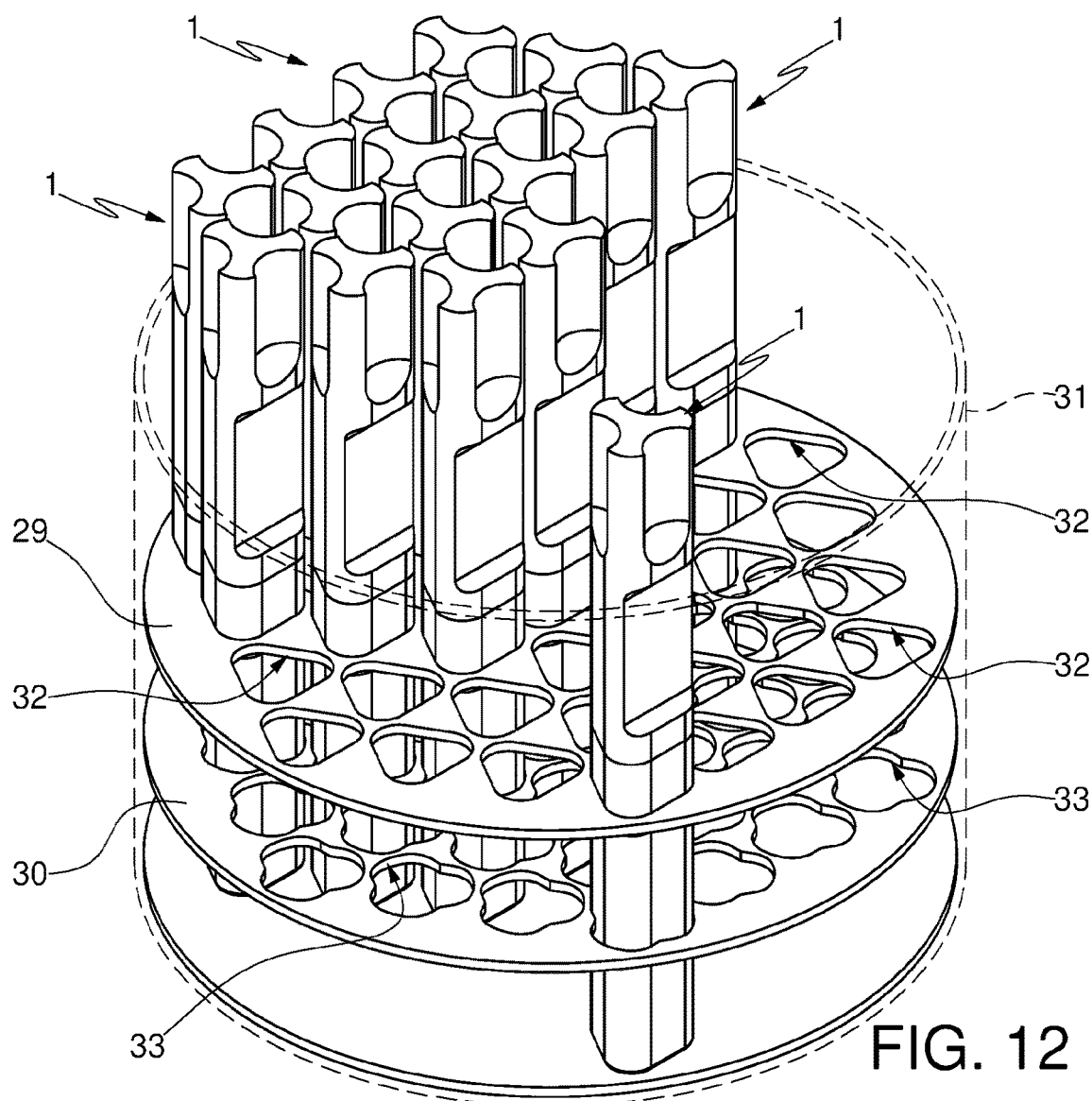
FIG. 12 is a schematic axonometric view of a plurality of devices according to the invention immersed in a container of liquid nitrogen.

This closed configuration is illustrated, for example, in FIGS. 7 and 12.

The first member 2 comprises at least one manual grip portion 4; moreover, the first member 2 comprises at least one support portion 5 for the adipose tissue.

In the embodiment illustrated in the figures, the grip portion 4 and the support portion 5 are constituted by two distinct elements, rigidly fixed to one another.

This allows, eventually, to make the two components in different materials, for example with different thermal conductivity properties, or still other properties, in relation to specific use requirements.

In other embodiments of the invention, the grip portion 4 and the support portion 5 could be made in a single piece.

The second member 3 comprises at least one housing 6; the support portion 5 of the first member 2 is insertable in the housing 6.

The housing 6 defines a volume for the cryopreservation of adipose tissue, adhering to the support portion 5, when the two members 2, 3 are coupled in the closed configuration of the device 1.

The grip portion 4 comprises an end 7 for coupling to the support portion 5.

The end 7 comprises, in turn, a seat 8; correspondingly, the support portion 5 comprises a terminal shank 9 insertable in said seat 8.

The seat 8 and the terminal shank 9 have a cylindrical or substantially cylindrical shape; they could also have a different geometry, in order to obtain, for example, a shape coupling adapted to connect the support portion 5 to the grip portion 4 with the desired orientation, relative to one another.

The grip portion 4 has a substantially prismatic shape, with a triangular section with rounded vertices, for a more ergonomic manual grip.

The grip portion 4 comprises, therefore, three lateral faces 4a, 4b, 4c; the three lateral faces 4a, 4b, 4c are therefore arranged according to respective planes inclined by 120° relative to one another.

In its terminal region opposite the end 7, the grip portion 4 comprises first recesses 10 that give the same a substantially three-lobed cross-section, which allows a more comfortable and secure manual grip (see, for example, the section of FIG. 4C).

Furthermore, the grip portion 4 comprises a second recess 11.

At least one identification element 12 is engageable/insertable in the second recess 11 (also visible in the section of FIG. 4D), for example to unambiguously distinguish the adipose tissue sample contained in the housing 6 of the second member 3.

The identification element 12 can be of any known type suitable for the application (for example, a barcode, an RFID tag, or still others).

The support portion 5 can be made of a material that is a good thermal conductor.

For example, the support portion 5 can be made of a suitable metallic material.

The support portion 5 comprises at least one elongated element 13.

The elongated element 13 is substantially flattened, and has a given concavity.

Furthermore, the elongated element 13 has a free rounded end, with a large radius of curvature.

This concavity of the elongated element 13 is clearly visible, for example, in FIG. 3D, 3F, or 4F.

This concavity of the elongated element 13 facilitates the removal and/or retention/containment of the adipose tissue; in more detail, it makes it possible to retain/contain a certain amount of adipose tissue (a greater amount compared to other known types of devices): this constitutes a considerable advantage for the cryopreservation process.

According to another aspect of the invention, the elongated element 13 comprises a plurality of holes 14.

The presence of the holes 14 serves to improve the thermal conduction properties of the elongated element 13.

The holes 14 can have, for example, a circular section or another shape.

The holes 14 can be distributed in a uniform manner, or substantially uniform, on the surface of the elongated element 13; alternatively, the holes 14 can be concentrated only in certain areas of the elongated element 13.

For example, the holes 14 can be concentrated only at the free end of the elongated element 13, where the adipose tissue to be frozen will most likely adhere, or where it is more frequently found to adhere.

The second member 3 has a substantially prismatic shape, with a triangular section with rounded vertices, for a more ergonomic manual grip.

For example, the second member 3 can be made with a very similar shape and size to that of the grip portion 4 of the first member 2.

For example, as illustrated in FIG. 5, the housing 6 provided in the second member 3 can be made substantially along the entire length of the latter, or only for a certain part of it.

The housing 6 can have a cylindrical section: this makes it possible to manually insert the elongated element 13 of the first member 2 in its interior according to different orientations, for greater convenience.

The housing 6 can regardless have a section of a different shape, for example in relation to specific requirements of use.

According to an aspect of the invention, the device 1 comprises constraint means 15 of the first member 2 to the second member 3.

In particular, the constraint means 15 are of the selective type, that is, which make it possible to lock the first member 2 with respect to the second member 3 when desired by the user, and therefore, when the user performs a specific operation.

The constraint means 15 are, in more detail, of the bayonet coupling type.

In the latter, therefore, the locking of the first member 2 with respect to the second member is carried out manually by performing a relative rotation between the two parts after insertion of the support portion 5 in the housing 6.

The constraint means 15 comprise at least one protrusion 16, provided in the end 7 of the grip portion 4; correspondingly, the constraint means 15 comprise at least one grooved seat 17, made in the mouth 18 of the housing 6.

The protrusion 16 is roughly shaped like a disk, or a truncated cone, with non-planar bases which follow the cylindrical curvature of the end 7 of the grip portion 4.

Figure 8:
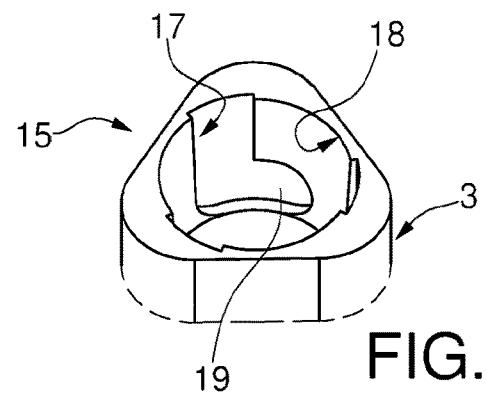
FIG. 8 is a detailed axonometric view of the mouth of the housing provided in the second member.
Figure 6:
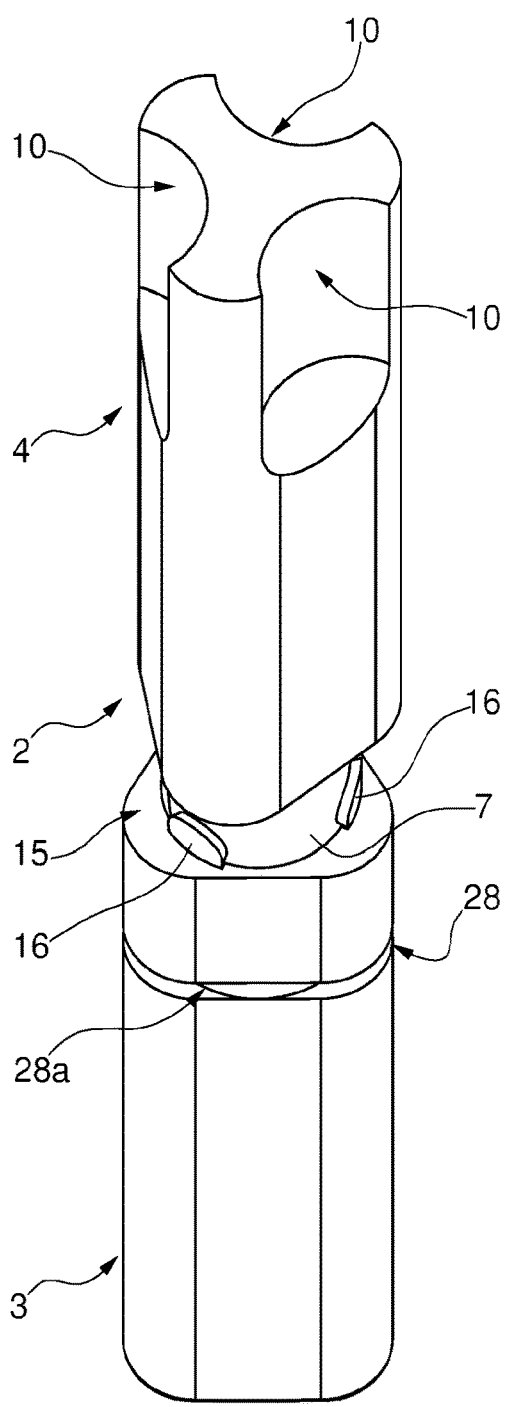
FIG. 6 is an axonometric view of the device in a coupling phase of the first member to the second member.

As illustrated in FIG. 8, the grooved seat 17 is substantially L-shaped, with a radiused or rounded terminal portion 19; the shape of the grooved seat 17 is such that the insertion of the protrusion 16 in its interior, and the subsequent rotation of the first member 2 with respect to the second member 3, determines the engagement of the protrusion 16 itself in the aforesaid terminal portion 19 (as shown in the coupling sequence of FIGS. 6, 7).

In this way, the locking is thus obtained of the first member 2 with respect to the second member 3 in an axial direction.

The section of the grooved seat 17 can be slightly conical, in the case wherein the protrusion 16 is truncated-conical: the coupling between the two parts, in this case, is particularly precise, hermetic and without any clearances.

To unlock the first member 2 with respect to the second member 3, the same are rotated in the direction opposite the locking direction.

In the specific embodiment illustrated in the figures, the constraint means 15 comprise a plurality of protrusions 16, provided in the end 7 of the grip portion 4.

More in detail, three protrusions 16 are provided in the end 7; these protrusions 16 are positioned angularly equidistant (120° to one another).

Correspondingly, in the mouth 18 of the housing 6 a plurality of grooved seats 17 are provided, with which said protrusions 16 respectively and selectively engage (in particular, three grooved seats 17 are therefore provided in the mouth 18).

Figure 10:
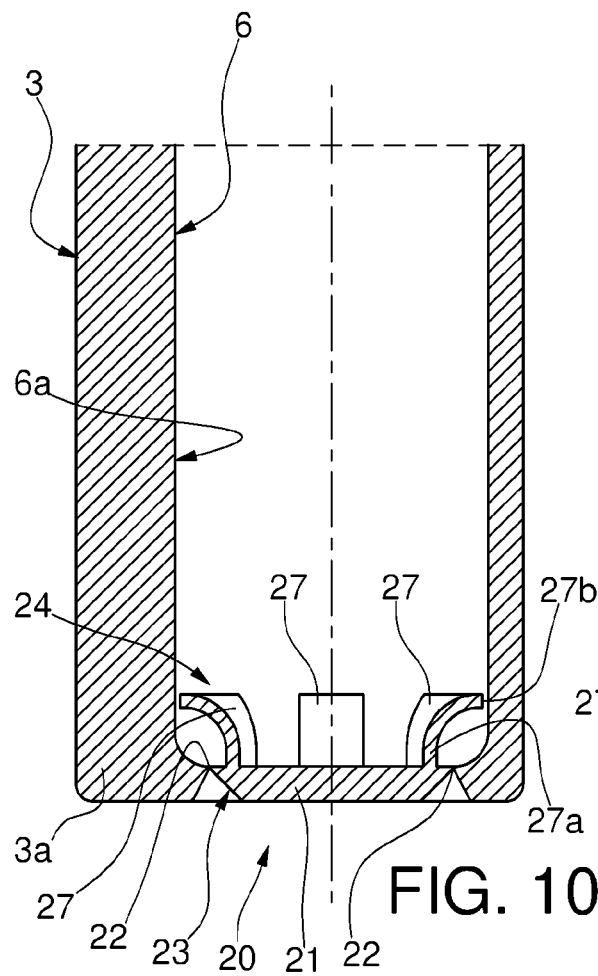
FIG. 10 is a detailed and sectioned side view of the second member of the device, in closed configuration.
Figure 11:
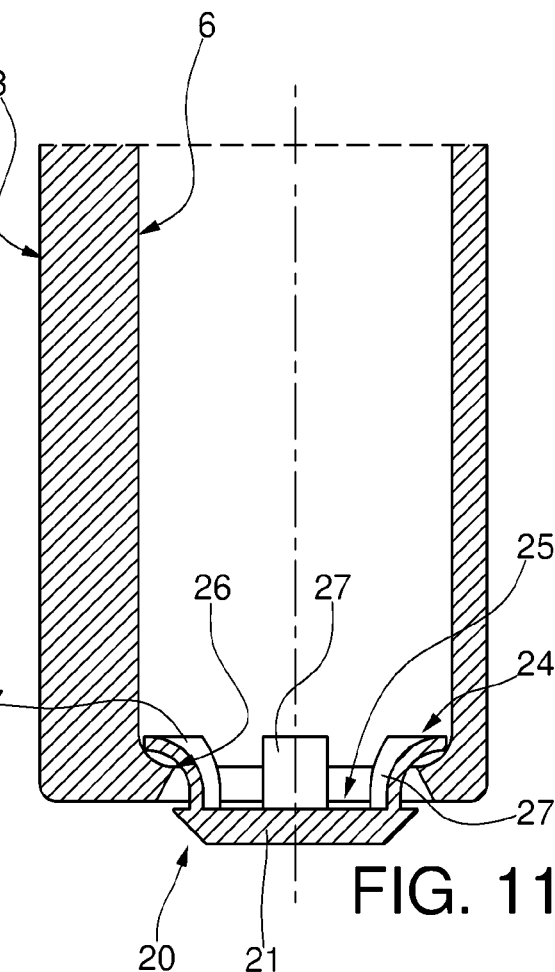
FIG. 11 is a detailed and sectioned side view of the second member of the device, in opened configuration.
Figure 9:
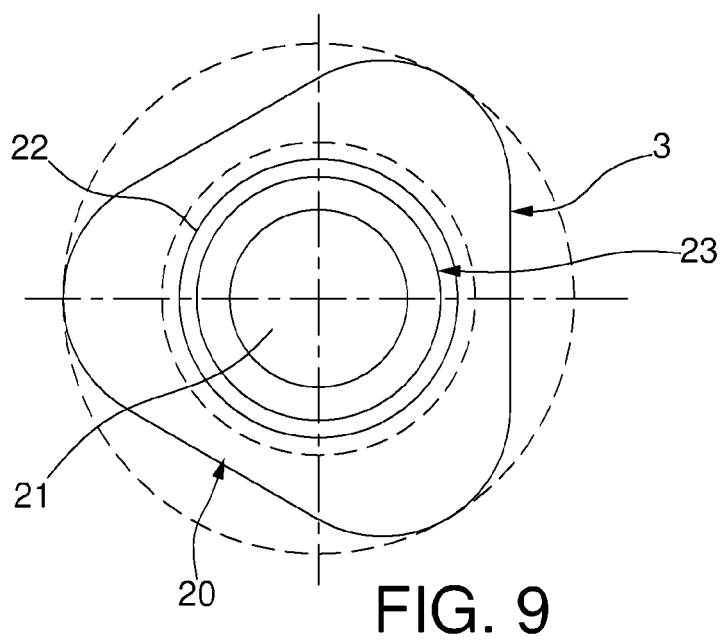
FIG. 9 is a front view of the second member of the device.

According to another aspect of the invention, and with particular reference to FIGS. 10, 11, the second member 3 comprises at least one safety valve 20.

The safety valve 20 is adapted to be activated in case the difference between the pressure outside and the pressure inside the housing 6 exceeds a predetermined value.

Typically—but not exclusively—this difference in pressure can be caused by the expansion of droplets of liquid nitrogen that have accidentally deposited inside the housing 6 itself before the closure of the device 1, that is, before having hermetically constrained the first member 2 to the second member 3.

In the case, therefore, wherein such a difference in pressure between the inside and the outside of the device 1 is excessive, the activation of the safety valve 20 makes it possible to save the adipose tissue contained in the device 1, and also makes it possible to safeguard operator safety, avoiding a possible explosion of the device 1 itself.

In fact, as is known, when nitrogen warms it expands to about seven hundred times its volume, and when it is compressed this can indeed cause explosions, or other uncontrollable and dangerous phenomena.

More in particular, the safety valve 20 comprises at least one separable portion 21 of the second member 3.

The separable portion 21 is adapted to be detached, partially or completely, from the body of the second member 3 when the difference in pressure between the inside and the outside exceeds a predetermined value.

The separable portion 21 is provided, in more detail, at the base 3a of the second member 3; the base 3a is opposite the insertion mouth 18 of the support portion 5.

The separable portion 21 is delimited by a breakable zone 22.

The separable portion 21 can be, for example, substantially shaped like a disk, and thus delimited by a circular, or substantially circular, breakable zone 22.

As shown in FIG. 10, the breakable zone 22 has a smaller thickness than that of the 25 second member 3 of the housing 6 (in particular of the base 3a).

A weakened region of the base 3a is obtained at the breakable zone 22, which breaks when a certain mechanical stress due to the difference between inside and outside pressure is reached.

The breakable zone 22 is defined, in turn, by a notch 23, made in the second member 3, in particular in the base 3a of the second member 3.

In the embodiment illustrated in the figures, the notch 23 is closed and circular (or substantially circular); the notch 23 has a triangular section, for example, or any other suitable shape.

In one embodiment of the invention, the breakable zone 22 can be made of a different material compared to the second member 3 and the separable portion 21; for example, the breakable zone 22 can consist of a ring of adhesive material or a plastic ring, applied to connect the two parts between them.

According to another aspect of the invention, the second member 3 further comprises retention means 24 of the separable portion 21, once it has detached.

The retention means 24 prevent the separable portion 21 from dispersing into the environment in an uncontrolled manner, and allow the same to remain in any case constrained to the second member 3 also following any breakage at the breakable zone 22.

In other words, following any breakage at the breakable zone 22, a gap 25 is obtained in the second member 3 through which the pressure that may have created within the housing 6 can be discharged; however, as a consequence of this event, the separable portion 21 is not projected into the environment accidentally, but remains constrained to the second member 3, so that the size of the gap 25 is such to allow the gases to discharge but not the adipose tissue, which remains protected inside the housing 6.

The detachment of the separable portion 21 therefore creates an opening 26 in the second member 3.

The opening 26 can be constituted by an opening, for example of a circular or other shape.

The gap 25 is thus defined between said opening 26, and the separable portion 21 itself, which remains constrained to the second member thanks to the retention means 24.

In the case wherein the opening 26 is constituted by a circular hole, the gap 25 is constituted, roughly, by a circular crown, suitably dimensioned so as to prevent the leakage of the adipose tissue from the housing 6.

This arrangement is extremely important as it makes it possible, as mentioned earlier, both to preserve the adipose tissue and prevent its loss, and to protect operators from any risks associated with the possible explosion of the device 1.

The triangular section of the notch 23 facilitates the creation of an opening 26 flared outwardly, and therefore a gap 25 with a suitable surface.

The retention means 24 are adapted to create an undercut between the separable portion 21 and the opening 26 of the second member 3, so as to prevent the separation between the two parts.

More in particular, the retention means 24 comprise at least one appendix 27 of the separable portion 21.

This appendix 27 is shaped so as to abut against the inner surface 6a of the housing 6, in particular so as to abut against the inner periphery of the opening 26; an undercut is thus obtained that prevents the complete detachment of the separable portion 21 from the second member 3.

The appendix 27 has a substantially divergent shape, with a divergence proceeding from the connecting zone 27a with said separable portion 21 towards the free end 27b.

When viewed in section, the appendix 27 can also have a certain curvature—proceeding in the direction of the divergence—in order to increase the distance from the free end 27b away from the centre of the separable portion 21; this makes it possible to further increase the extent of the undercut of the retention means 24.

The separable portion 21 and the appendix 27 can be made in a single piece, or in separate parts connected to one another.

In the embodiment illustrated in the figures, the retention means 24 comprise, more specifically, a plurality of appendices 27 of the type previously described.

The appendices 27 are angularly spaced from one another with respect to the centre of the separable portion 21, or arranged in any other way deemed convenient.

For example, a number of appendices 27 can be provided from two to six, or even higher.

The size of the appendices 27 and their number can be suitably modified such as to obtain the gap 25 of desired width.

As can be well understood by observing FIG. 11 (which shows the second member 3 with the separable portion 21 detached in detail), an increase in the size of the gap 25 facilitates the discharge of the pressurized gas which may have formed within the housing 6; at the same time, an increase in the size of the gap 25 could increase the risk of leakage, also of parts of the adipose tissue, in addition to the gases.

It is therefore necessary to reach a fair balance between the two conflicting requirements.

According to another aspect of the invention, the second member 3 of the device 1 comprises at least a coupling portion 28 to at least a support 29, 30 provided in the container 31 of liquid nitrogen, wherein the device 1 is intended to be immersed in order to obtain the cryopreservation of adipose tissue contained therein.

The coupling portion 28 can comprise, for example, at least one perimeter groove 28a, wherein a corresponding support zone 29, 30 can engage.

The bottom of the perimeter groove 28a has a cylindrical surface.

FIG. 12 schematically illustrates a plurality of devices 1 according to the invention, immersed in a container 31 of liquid nitrogen.

The container 31 of liquid nitrogen is also an object of the present invention.

Figures 13, 14:
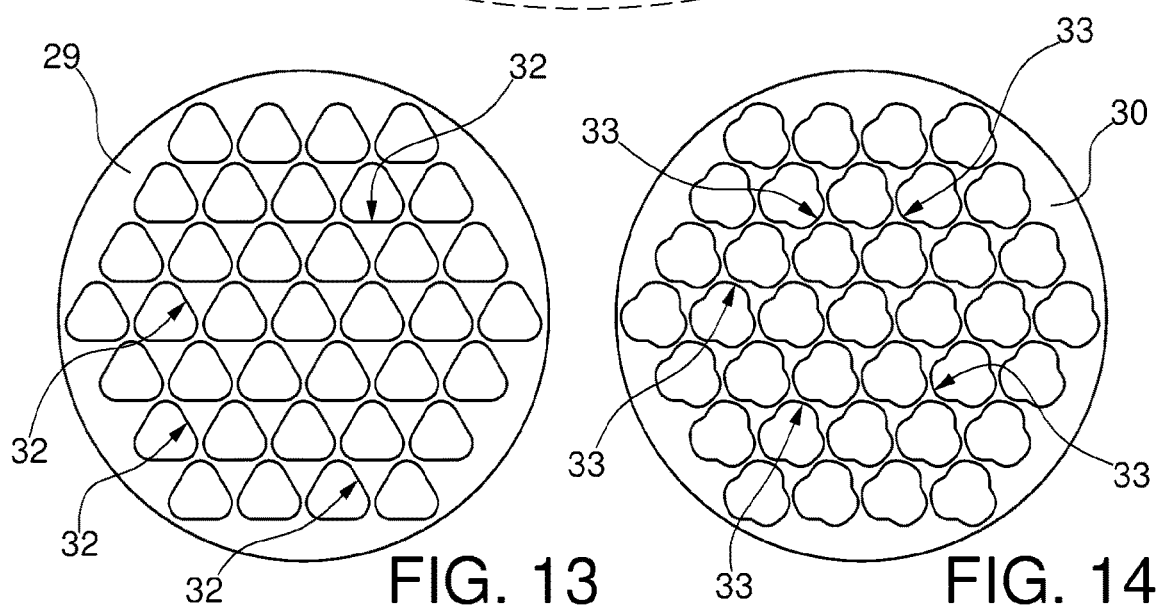
FIGS. 13, 14 are plan views of constructive details of the container of liquid nitrogen.

FIGS. 13, 14 instead show the constructive details of the same container 31; in particular, these figures show two different supports 29, 30 (i.e., in particular, a first support 29 and a second support 30), associable to the container 31, for storing a plurality of devices 1 immersed in liquid nitrogen.

The shape and size of the container 31 can be any, in relation to the specific application requirements.

In one version of the invention, it can be provided with a single support 29, 30 associated with the container 31.

Each support 29, 30 is constituted by a plate, or disk, (for example in metallic material, but not necessarily) and comprises a plurality of first, second shaped holes 32, 33, which are insertable in the respective devices 1.

The first shaped holes 32 and the second shaped holes 33 are arranged in exactly the same way in both the first support 29 and in the second support 30.

In the embodiment illustrated in FIG. 13, the first shaped holes 32 provided in the first support 29 have the same shape as the cross-section of the second member 3 of the device 1, so as to allow the easy insertion of the latter.

As shown in FIG. 12, the various devices 1 are then kept in the container 31 in an orderly manner, optimizing the exploitation of the volume available within the same.

The edges of the first shaped holes 32 can then engage in the grooves 28a of the respective devices 1.

In this way, by rotating the device 1 itself, after insertion into a respective first shaped hole 32, the edge of the latter can be brought to engage in the perimeter groove 28a of the respective device 1, so as to obtain a suspended support of the same, and in such a way as to prevent the device 1 from coming into contact with the bottom of the container 31 (such to avoid thermal bridges in the contact between the two parts).

The second shaped holes 33 of the second support 30 instead have a three-lobed shape, which allows the rotation of each device 1 around its own longitudinal axis to engage, as mentioned, the edge of the corresponding first shaped hole 32 in the respective groove 28a. FIGS. 15, 16 show a simplified version of the device according to the invention, which differs from the previous one in that the grip portion 4 of the first member 3 lacks identification elements 12.

The usage method of the device 1 according to the invention is, in the light of what has been described, entirely intuitive.

The adipose tissue to be frozen is deposited on the support portion 5 of the first member 2, and the latter is inserted inside the housing 6 of the second member 3.

Using the constraint means 15 of the bayonet coupling type, the first member 2 and the second member 3 are joined and locked relative to one another, thus obtaining a closed configuration of the device 1.

The device 1 can then be immersed in the container 31, possibly using the supports 29, 30 for stable and orderly placement.

In the event that any drops of liquid nitrogen that have accidentally penetrated inside the housing 6 should expand in an uncontrolled manner, the presence of the safety valve 20—thanks to the detachment of the separable portion 21—allows, on the one hand, the discharge of the gas outside through the gap 25, thus protecting the operators; on the other hand, the safety valve 20—thanks to the presence of the retention means 24—nonetheless retains the adipose tissue inside the housing 6, preventing it from being dispersed.

It has thus been seen how the invention achieves the intended purposes.

The device 1 according to the invention also allows the use of the direct immersion in liquid nitrogen technique for the cryopreservation of adipose tissue, with numerous advantages from various points of view.

Furthermore, the device 1 is reliable and safe to use particularly from the point of view of eliminating contamination risks or loss of the removed tissue, and from the point of view of operator safety.

Thanks to the size of the support portion 5, the device makes it possible to preserve relatively high quantities of adipose tissue, a result which cannot be obtained using other known types of devices; furthermore, the film of adipose tissue freezes rapidly, thanks to the particular shape of the support portion 5 and the presence of the holes 14 in the same.

The constraint means 15 of a bayonet coupling type make it possible, in a simple and practical way, to hermetically seal the device 1, and this is particularly important considering the fact that it is immersed in liquid nitrogen.

Last but not least, the device 1 is constructively very simple and inexpensive, made with few parts that are easily assemblable.

The present invention has been described according to preferred embodiments, but is equivalent variants are still possible without departing from the scope of the appended claims.

The invention claimed is:

1. A device to freeze adipose tissue, the device comprising:
   a closure and a receptacle mutually coupleable and configured to close the device tight for cryopreservation of the adipose tissue, said closure comprising at least one manual grip portion and at least one support portion to which the adipose tissue adheres, said receptacle comprising at least one housing in which at least said support portion of said closure can be inserted, said receptacle further comprising at least one safety valve, suitable for activating in case that a difference between an outside pressure and a pressure inside said housing exceeds a predetermined value, wherein
   said at least one safety valve comprises at least one separable portion of said receptacle, adapted to be detached, partially or completely, from a body of said receptacle in the case in which the difference in pressure between the inside and the outside exceeds the predetermined value, and
   said at least one separable portion is delimited by a breakable zone, and
   said receptacle further comprises a retainer of said separable portion, once it has detached, and in that detachment of said at least one separable portion defines an opening in said receptacle, between said opening and said at least one separable portion, retained by said retainer, a gap being defined to let out gases contained inside said housing.

2. A device according to claim 1, wherein said breakable zone is defined by a notch made in said receptacle to obtain a weakened region which breaks when a certain mechanical stress due to the difference between inside and outside pressure is reached.

3. A device according to claim 2, wherein said notch is circular and is made in a base of said receptacle.

4. A device according to claim 2, wherein said notch has a triangular section.

5. A device according to claim 1, wherein said retainer includes an undercut between said at least one separable portion and said opening to prevent separation between the at least one separable portion and the receptacle.

6. A device according to claim 5, wherein said retainer comprises at least one appendix of said at least one separable portion, shaped to abut against an inner surface of said housing, said appendix including a connecting zone with said at least one separable portion.

7. A device according to claim 6, wherein said appendix has a divergent shape, with a divergence proceeding from the connecting zone with said at least one separable portion towards a free end.

8. A device according to claim 6, wherein said retainer comprises a plurality of said appendixes, angularly spaced one from another with respect to a center of said at least one separable portion.

9. A device according to claim 1, comprising a coupling shaped as a bayonet coupling of said closure to said receptacle.

10. A device according to claim 1, wherein said support portion comprises at least one elongated element, substantially flattened, provided with a given concavity.

11. A device according to claim 10, wherein said elongated element comprises a plurality of holes suitable for improving thermal conduction properties thereof.

12. A container of liquid nitrogen comprising at least a support for a plurality of devices and at least one of the plurality of the plurality of devices to freeze the adipose tissue according to claim 1.

13. A container according to claim 12, comprising:
- a first support including first holes having a prismatic shape, with a triangular section with rounded vertices; and
- a second support including second holes having a three-lobed shape.

14. A container according to claim 13, wherein said second support of said device comprises at least one coupling portion to said first support, said coupling portion comprising at least one perimeter groove in which an edge of a first hole is engageable.

15. A container according to claim 14, wherein said grip portion of said closure and said receptacle of said device have a prismatic shape, with a triangular section with rounded vertices as each of said first holes, while each of said second holes has a three-lobed shape, of said second support allows rotation of each device around its own longitudinal axis to engage said edge of the first hole in a perimeter groove of said coupling portion of said receptacle.

* * * * *